United States Patent
Zhu et al.

(10) Patent No.: US 11,320,643 B2
(45) Date of Patent: May 3, 2022

(54) COMPOSITE PRISM FOR MULTI-FUNCTIONAL TELESCOPE, AND BINOCULAR TELESCOPIC OPTICAL SYSTEM FOR SAME

(71) Applicant: CHONGQING HYLON CO., LTD., Chongqing (CN)

(72) Inventors: Jie Zhu, Chongqing (CN); Mingxiao Gao, Chongqing (CN)

(*) Notice: Subject to any disclaimer, the term of this patent is extended or adjusted under 35 U.S.C. 154(b) by 394 days.

(21) Appl. No.: 16/472,887

(22) PCT Filed: Dec. 23, 2016

(86) PCT No.: PCT/CN2016/111830
§ 371 (c)(1),
(2) Date: Jun. 23, 2019

(87) PCT Pub. No.: WO2018/112929
PCT Pub. Date: Jun. 28, 2018

(65) Prior Publication Data
US 2020/0088987 A1    Mar. 19, 2020

(51) Int. Cl.
*G02B 23/10* (2006.01)
*G02B 5/04* (2006.01)

(52) U.S. Cl.
CPC ............ *G02B 23/105* (2013.01); *G02B 5/04* (2013.01)

(58) Field of Classification Search
CPC . G02B 23/18; G02B 7/06; G02B 7/12; G02B 23/12; G02B 23/125; G02B 23/02;
(Continued)

(56) References Cited

U.S. PATENT DOCUMENTS 6,002,473 A * 12/1999 West ................ G01C 15/00
356/153
2008/0068721 A1 * 3/2008 Murnan ............ G02B 27/106
359/629
(Continued)

FOREIGN PATENT DOCUMENTS

DE          304289       * 11/1921    ............ G02B 23/08

OTHER PUBLICATIONS

DE304289 English translation (Year: 1921).*

*Primary Examiner* — William R Alexander
*Assistant Examiner* — Sharrief I Broome
(74) *Attorney, Agent, or Firm* — Novoclaims Patent Services LLC; Mei Lin Wong

(57) ABSTRACT

A composite prism for multi-functional telescopes, and binocular telescopic optical system thereof. The composite prism comprises a first half-pentaprism (2), a roof prism (3), and a second half-pentaprism (4). Longer right-angled surfaces of the first half-pentaprism (2) and second half-pentaprism (4) are cemented onto a bottom surface of the roof prism (3). A light incident plane of the roof prism (3) and a light emission plane thereof share the same one and are parallel to a roof edge of the roof prism (3), such that a light incident axis of the composite prism is parallel to a light emission axis thereof. A binocular telescopic optical path system comprises an objective lens (1), the composite prism, a reticle lens (5), and an eyepiece (6), and has functions of viewing, sighting, laser emitting and receiving, and display.

10 Claims, 4 Drawing Sheets

(58) Field of Classification Search
CPC ...... G02B 25/004; G02B 7/002; G02B 23/00; G02B 27/646; G02B 23/04; G02B 23/16; G02B 27/0172; G02B 2027/0178; G02B 23/10; G02B 7/1805; G02B 17/0808; G02B 2027/0132; G02B 23/14; G02B 25/001
See application file for complete search history.

(56) References Cited

U.S. PATENT DOCUMENTS

| | | | |
|---|---|---|---|
| 2008/0083886 A1* | 4/2008 | Faklis | G02B 27/0905 250/504 R |
| 2018/0080630 A1* | 3/2018 | Wang | F21V 13/12 |

* cited by examiner

COMPOSITE PRISM FOR MULTI-FUNCTIONAL TELESCOPE, AND BINOCULAR TELESCOPIC OPTICAL SYSTEM FOR SAME

TECHNICAL FIELD

The present invention generally relates to an optical system, more particularly to a composite prism for multi-functional telescopes and a binocular telescopic optical system thereof.

BACKGROUND

Telescopes have become fashion consumer goods for the public. However, the existing telescopes in the market have the only function of viewing of distant objects, and laser ranging telescopes in the prior art are monocular model, which is inconvenient for users to view. Thus, it is desired to design a telescope which not only has the function of binocular viewing, but also can measure quickly target distance and target velocity by emitting laser, has the function of simultaneous or selective measurement of longitude and latitude, azimuth angle, angular altitude, altitude, level degree, north azimuth and so on, and can display the measured data information in a field of view directly or in projection mode via transmissive liquid crystal display (LCD) or Organic Light-Emitting Diode (OLED). Improvement of an optical system is one of technological difficulties in the field.

SUMMARY

For that reason, the invention provides a binocular telescopic optical system with the multifunction of distance and velocity measurement and projection display, and a composite prism applied in the system. The binocular telescopic optical system not only has the function of binocular viewing of distant objects and observation, but also can measure quickly target distance and target velocity by emitting laser, can display the measured data information in a field of view directly or in projection mode via transmissive liquid crystal display (LCD) or Organic Light-Emitting Diode (OLED), can adjust focal distance and pupillary distance via a central axis, and can adjust visibilities of a left eyepiece and a right eyepiece respectively.

In order to achieve the objectives of the invention, a technical scheme is provided in the invention that a composite prism for multifunctional telescopes comprises a first half-pentaprism, a roof prism and a second half-pentaprism, with longer right-angled surfaces of the first half-pentaprism and the second half-pentaprism cemented onto a bottom surface of the roof prism; a light incident plane and a light emission plane of the roof prism share the same one and are parallel to a roof edge of the roof prism such that a light incident axis of the composite prism is parallel to its light emission axis.

In accordance with the above structure of the composite prism, alternatively, the second half-pentaprism can be replaced by a combination of a triangle prism and a wedge prism or an isosceles prism cemented together, such that one of obtuse-angled surfaces of the triangle prism is cemented onto the bottom surface of the roof prism and the other obtuse-angled surface is cemented onto the wedge prim or the isosceles prism. Other features remain unchanged.

In the two structures above, two end surfaces of the roof prism can be lighttight surfaces which are not vertical to the incident optical axis of the composite prism, or can be light-transmitting surfaces which are vertical to the incident optical axis of the composite prism.

In accordance with the binocular telescopic optical system of the composite prism described above, a technical scheme is provided that the binocular telescopic optical system comprises an objective lens, the composite prism and an eyepiece, wherein light passes into the first half-pentaprism of the composite through the objective lens, enters into the roof prism from the cemented surfaces of the first pentaprism and the roof prism through the reflection of an oblique surface of the first half-pentaprism, enters into the second pentaprism after emitted from the bottom surface of the roof prism through the reflection of a roof surface of the roof prism, enters the eyepiece from the other right-angled surface of the second pentaprism after reflected by an oblique surface of the second half-pentaprism, and then is emitted from the eyepiece, such that viewing can be performed via the eyepiece.

In a focal plane of the objective lens in the binocular telescopic optical system discussed above, is arranged a reticle lens manufactured from glass plate or transmissive liquid crystal display (LCD) or Organic Light-Emitting Diode (OLED), such that the functions of sighting, measurement and information display can be achieved.

Further, cemented surfaces of the first half-pentaprism and the roof prism are coated with a light-splitting film which can reflect laser light and is transmissive to visible light, and a laser or a laser receiver is arranged on an optical path vertical to an oblique surface of the first half-pentaprism. Or alternatively, cemented surfaces of the triangle prism and the wedge prism or the isosceles prism are coated with the light-splitting film which can reflect laser light and is transmissive to visible light, and the laser or the laser receiver is arranged on an optical path vertical to a larger reflection surface of the triangle prism. Thereby the function of distance and velocity measurement via laser can be achieved.

When the two end surfaces of the roof prism are light-transmitting surfaces which are vertical to the incident optical axis, the cemented surfaces of the triangle prism and the isosceles prism are coated with the light-splitting film which can reflect laser light and red light and is transmissive to visible light, and a display is arranged on an optical path vertical to the end surfaces of the roof prism, such that light emitted from the display passes through the two end surfaces of the roof prism, enters into the isosceles prism via imaging of lens and reflection of reflection mirror, and then is emitted from the isosceles prism through reflection of the light-splitting film on the cemented surface of the isosceles prism, thereby information displayed by the display is projected onto the focal plane of the objective lens.

The said composite prism for multi-functional telescopes and the binocular telescopic optical system thereof have advantages as followed.

(1) The improved optical transmittance and the maintained stability of the optical path can be realized by the combination of the composite prism's each parts cemented together.

(2) Although the composite prism's each parts are cemented together to an entity, each parts can be adjusted flexibly, such that the composite prism suits universally to various kinds of binocular telescopic optical systems with different aperture sizes and rates of the objective lens, and multi-functions or selective functions can be achieved in the binocular telescopic optical system.

(3) The greatly decreased difficulties of coating process for the light splitting film and the improved performance of the light splitting film can be obtained due to the low polarization resulted from a small incident angle (less than 30°) of the light on light-splitting surfaces of the composite prism.

(4) The reduced space occupation is obtained by the well-designed combination of the display projection system and the composite prism, thereby forming a compact structure.

(5) The improved optical transmittance can be achieved by arranging the reticle lens made from glass plate or transmissive LCD or OLED in the focal plane of the objective lens, or alternatively by projecting various digital information or images onto the focal plane of the objective lens by the projection system with the replacement of the reticle lens. More particularly, the optical transmittance is more remarkably improved by the projection system than by the transmissive LCD or OLED with low transmittance.

DETAILED DESCRIPTION

A composite prism designed uniquely is utilized in a multifunctional telescopic optical system in the invention. The composite prism referred to HYLON prism here is a combination of a plurality of prisms cemented together or otherwise combined together. A main part of the composite prism is a roof prism whose incident plane and emission plane share the same one and are parallel to a roof edge, such that the roof prism acts as a right-angle prism when an optical axis is perpendicular to the incident and emission plane. Therefore, the optical axis is not perpendicular to the incident and emission plane in practical application. Two end faces of the roof prism can be lighttight surfaces which are not vertical to an incident optical axis of the composite prism, or can be light-transmitting surfaces which are vertical to the incident plane. There are six specific forms of the HYLON prism which include HYLON-A, HYLON-A1, HYLON-A2, HYLON-B, HYLON-B1 and HYLON-B2. Different functions can be achieved in distinct telescopic optical systems with different HYLON prism designs, specific structures of the different prisms and corresponding optical systems being as follows.

The First Embodiment: HYLON-A Prism and its Application Example

Figure 1:
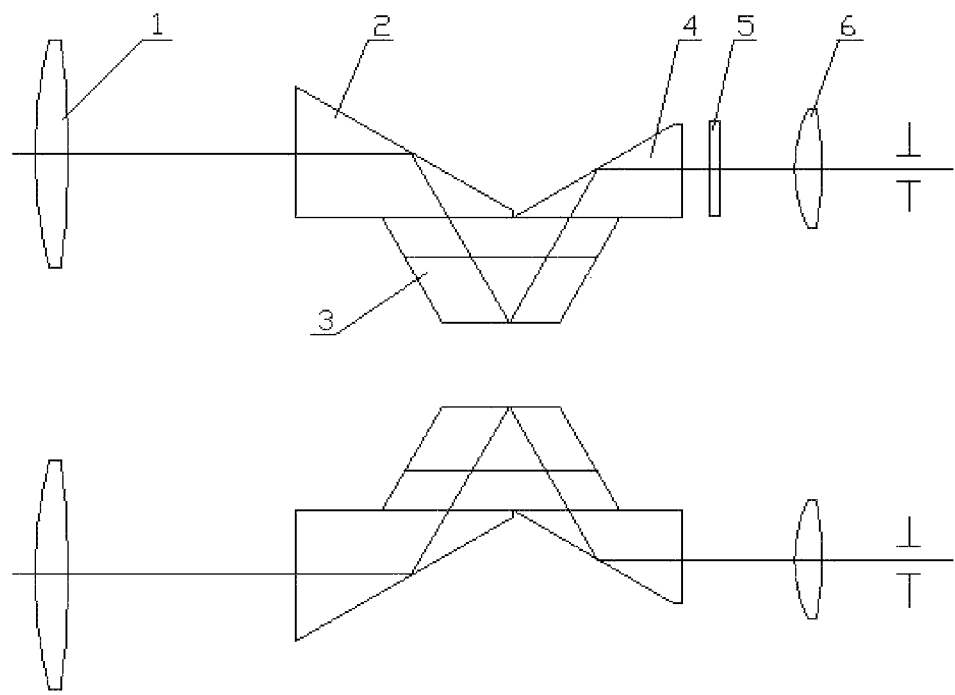
FIG. 1 is a schematic diagram of an optical path system in accordance with a first embodiment.

As shown in FIG. 1, the HYLON prism is a combination of a first half-pentaprism 2, a roof prism 3 and a second half-pentaprism 4 cemented together. An optical system of a binoculars is constituted by an objective lens 1, the HYLON prism and an eyepiece 6. A reticle lens 5 is arranged in one of lens barrels such that a function of viewing or sighting corresponding to different partitions is achieved.

The Second Embodiment: HYLON-A1 Prism and its Application Example

Figure 2:
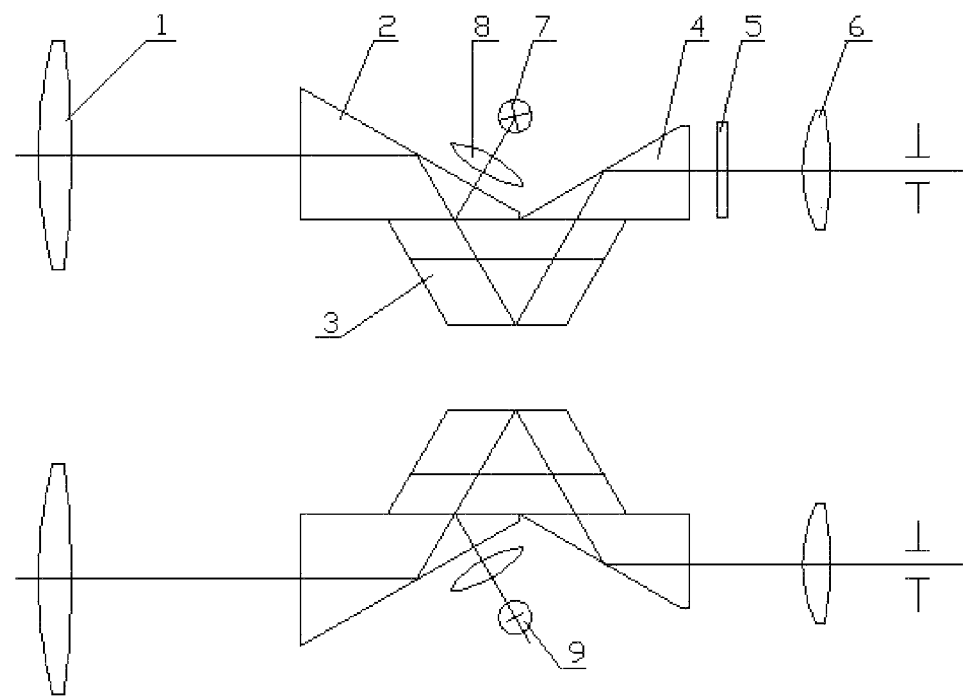
FIG. 2 is a schematic diagram of an optical path system in accordance with a second embodiment.

In the embodiment, the HYLON-A1 prism consists of the first half-pentaprism 2, the roof prism 3 and the second half-pentaprism 4 cemented together. The HYLON-A1 is different from the HYLON-A in that a longer right-angled surface of the first half-pentaprism 2 in the HYLON-A1 is coated with a light-splitting film which can reflect laser light and is transmissive to visible light, as seen in FIG. 2. The telescopic optical system with functions of sighting and binocular viewing is constituted by the objective lens 1, the HYLON-A1 prism, the reticle lens 5 and the eyepiece 6. A laser emission system is constituted by a laser 7, a lens 8, the HYLON-A1 prism and the objective lens 1. A laser receiving system 9 is constituted by a laser receiver 9, the lens 8, the HYLON-A1 prism and the objective lens 1. As shown in FIG. 2, the four systems described above constitute a laser ranging binoculars. A laser signal (or laser signals) measured by the laser ranging binoculars is(are) transformed into data information via a signal processing circuit (or signal processing circuits) which is displayed in field of view of the binoculars through the reticle lens 5 made from transmissive liquid crystal display (LCD) or Organic Light-Emitting Diode (OLED).

The Third Embodiment: HYLON-A2 Prism and its Application Example

Figure 3:
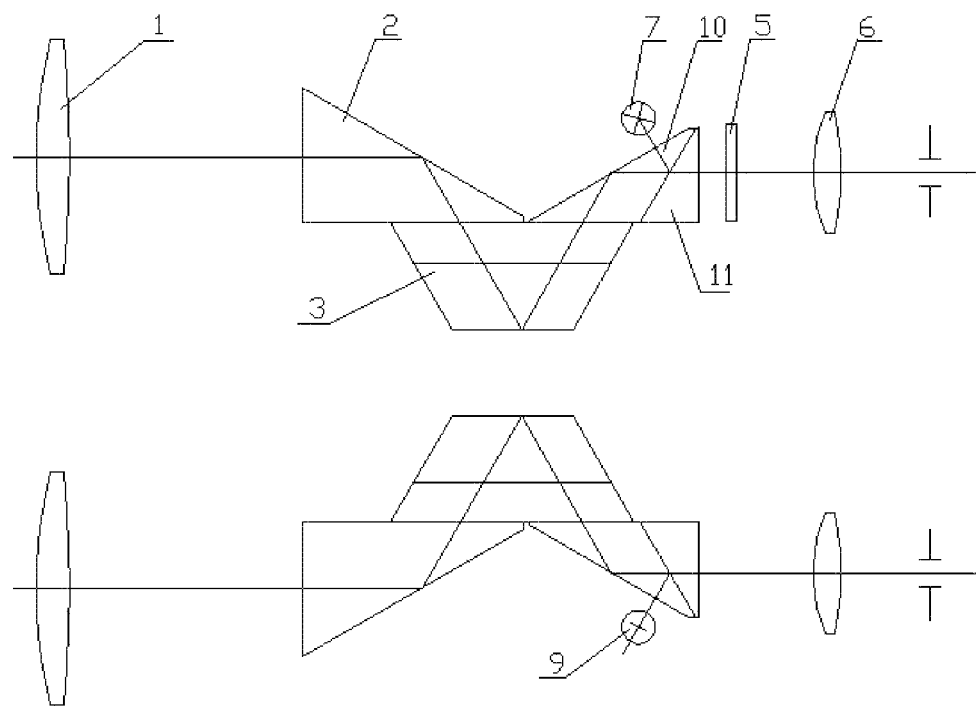
FIG. 3 is a schematic diagram of an optical path system in accordance with a third embodiment.

In the embodiment, the HYLON-A2 prism is constituted by the first half-pentaprism 2, the roof prism 3, a triangular prism 10 and a wedge prism 11 cemented together. The HYLON-A2 is different from the HYLON-A in that the second half-pentaprism is formed by the triangular prism 10 and the wedge prism 11 cemented together, with cemented surfaces coated with the light-splitting film which can reflect laser light and is transmissive to visible light, as seen in FIG. 3. The telescopic optical system with the functions of sighting and binocular viewing is constituted by the objective lens 1, the HYLON-A2 prism, the reticle lens 5 and the eyepiece 6. The laser emission system 7 is constituted by the laser 7, the HYLON-A2 prism and the objective lens 1. The laser receiving system 9 is constituted by the laser receiver 9, the HYLON-A2 prism and the objective lens 1. As shown in FIG. 3, the four systems described above constitute the laser ranging binoculars. The laser signal(s) measured by the laser ranging binoculars is transformed into data information via the signal processing circuit(s) which is displayed in field of view of the binoculars through the reticle lens 5 made from transmissive liquid crystal display (LCD) or Organic Light-Emitting Diode (OLED).

The Fourth Embodiment: HYLON-B Prism and its Application Example

Figure 4:
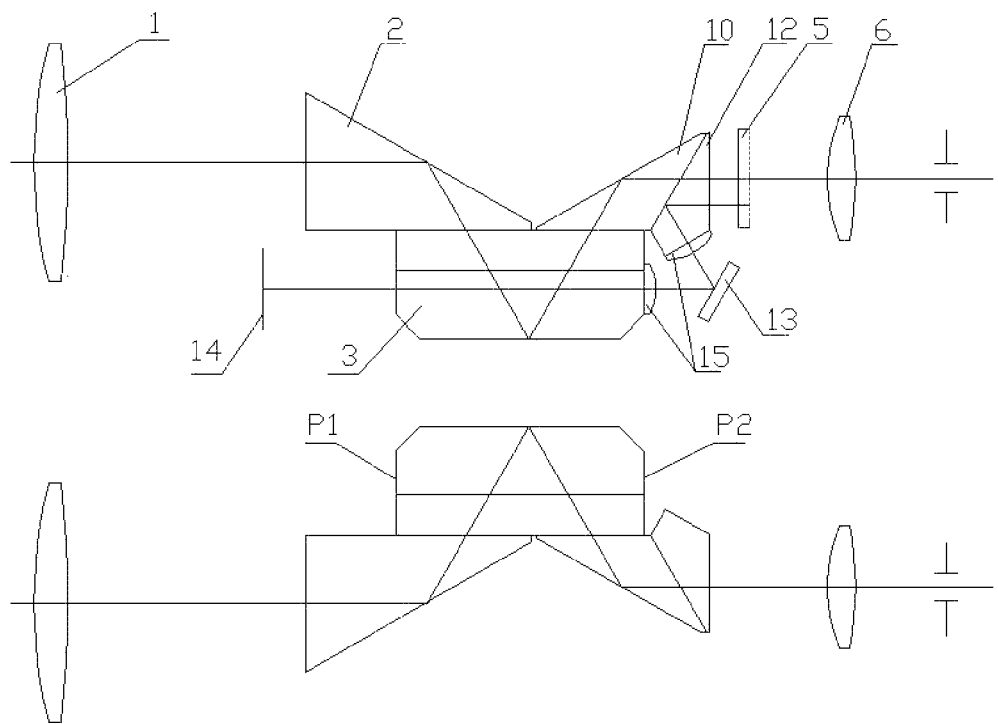
FIG. 4 is a schematic diagram of an optical path system in accordance with a fourth embodiment.

In the embodiment, the HYLON-B prism is constituted by the first half-pentaprism 2, the roof prism 3, the triangular prism 10 and an isosceles prism 12 cemented together. The cemented surfaces of the triangular prism 10 and the isosceles prism 12 are coated with the light-splitting film which can reflect red light and is transmissive to other visible light. Two end surfaces P1, P2 of the roof prism 3 are transmissive to light and are vertical to the incident light axis of the composite prism, forming a light-transmitting panel. As shown in FIG. 4, the telescopic optical system is constituted by the objective lens 1, the HYLON-B prism and the eyepiece 6, and a projection system consists of a display 14, the roof prism 3, a lens 15, a reflection mirror 13, the isosceles prism 12 and the triangular prism 10. The reticle lens 5 is arranged in one of lens barrels such that the function of viewing or sighting corresponding to different partitions is achieved. Alternatively, the reticle lens 5 can be replaced by projecting images displayed by the display 14 onto a focal plane of the objective lens, therefore achieving the function of the reticle lens, as seen in FIG. 4.

The Fifth Embodiment: HYLON-B1 Prism and its Application Example

Figure 5:
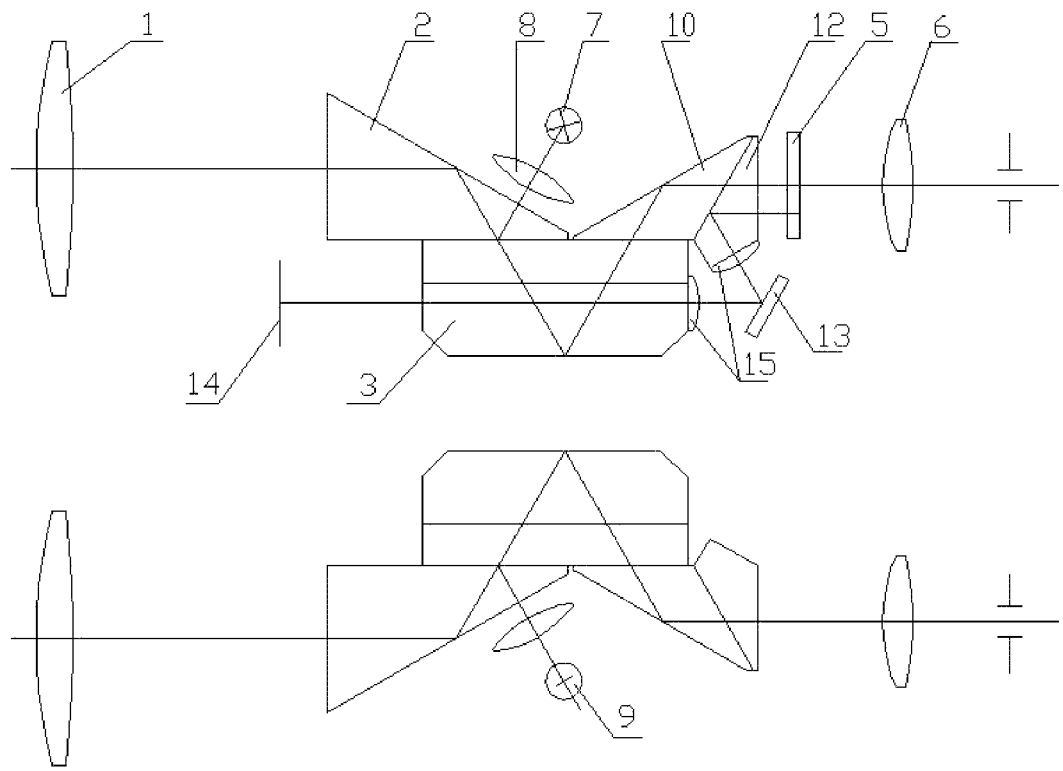
FIG. 5 is a schematic diagram of an optical path system in accordance with a fifth embodiment.

In the embodiment, the HYLON-B1 prism is constituted by the first half-pentaprism 2, the roof prism 3, the triangular prism 10 and the isosceles prism 12 cemented together. The HYLON-B1 is different from the HYLON-B in that the cemented surface of the first half-pentaprism 2 in the HYLON-B1 is coated with the light-splitting film which can reflect laser light and is transmissive to visible light, as seen in FIG. 5. The telescopic optical system with the functions of sighting and binocular viewing is constituted by the objective lens 1, the HYLON-B1 prism, the reticle lens 5 and the eyepiece 6. The laser emission system is constituted by the laser 7, the lens 8, the HYLON-B1 prism and the objective lens 1. The laser receiving system 9 is constituted by the laser receiver 9, the lens 8, the HYLON-B1 prism and the objective lens 1. As shown in FIG. 5, the four systems described above constitute the laser ranging binoculars. The laser signal(s) measured by the laser ranging binoculars is transformed into data information via the signal processing circuit(s) which is projected in the focal plane of the objective lens 1 via the projection system constituted by the display 14, the HYLON-B1 prism, the lens 15 and the reflection mirror 13, and then is displayed in field of view of the binoculars.

The Sixth Embodiment: HYLON-B2 Prism and its Application Example

Figure 6:
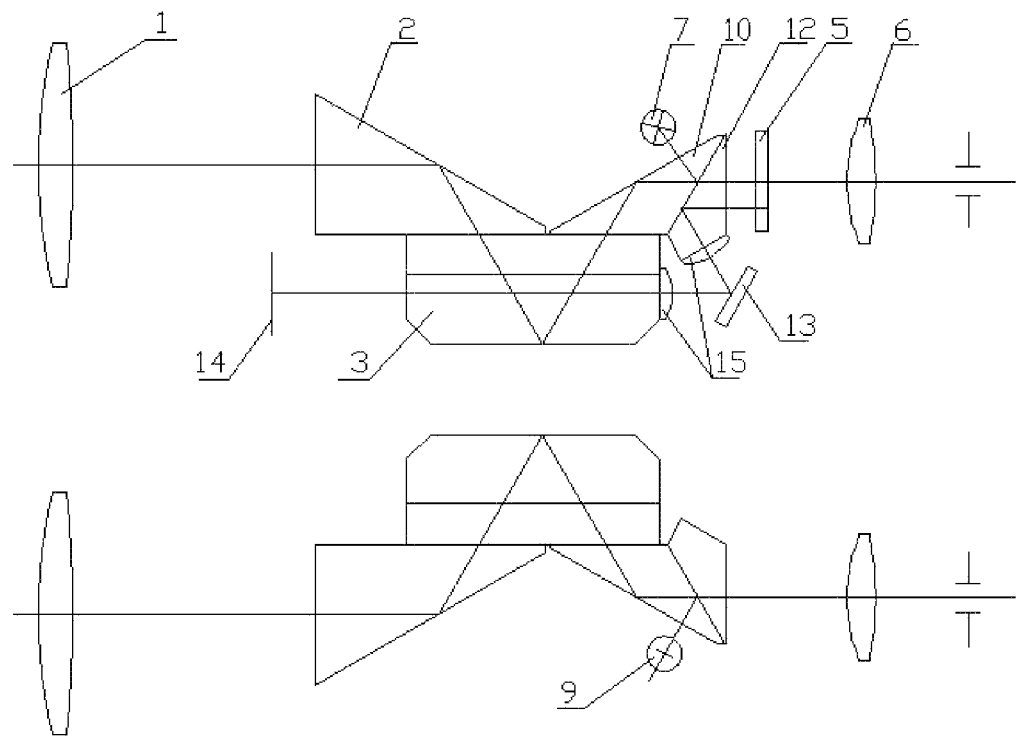
FIG. 6 is a schematic diagram of an optical path system in accordance with a sixth embodiment.

In the embodiment, the HYLON-B2 prism is constituted by the first half-pentaprism 2, the roof prism 3, the triangular prism 10 and the isosceles prism 12 cemented together. The HYLON-B2 is different from the HYLON-B in that the cemented surfaces of the triangular prism 10 and the isosceles prism 12 are coated with the light-splitting film which can reflect laser light and red light and are transmissive to other visible light. As seen in FIG. 6, the telescopic optical system with the functions of sighting and binocular viewing is constituted by the objective lens 1, the HYLON-B2 prism, the reticle lens 5 and the eyepiece 6. The laser emission system is constituted by the laser 7, the HYLON-B2 prism and the objective lens 1. The laser receiving system 9 is constituted by the laser receiver 9, the HYLON-B2 prism and the objective lens 1. As shown in FIG. 6, the four systems described above constitute the laser ranging binoculars. The laser signal(s) measured by the laser ranging binoculars is transformed into data information via the signal processing circuit(s) which is projected in the focal plane of the objective lens 1 via the projection system constituted by the display 14, the HYLON-B2 prism, the lens 15 and the reflection mirror 13, and then is displayed in field of view of the binoculars.

The Seventh Embodiment: HYLON Prism and its Application Example

Figure 7:
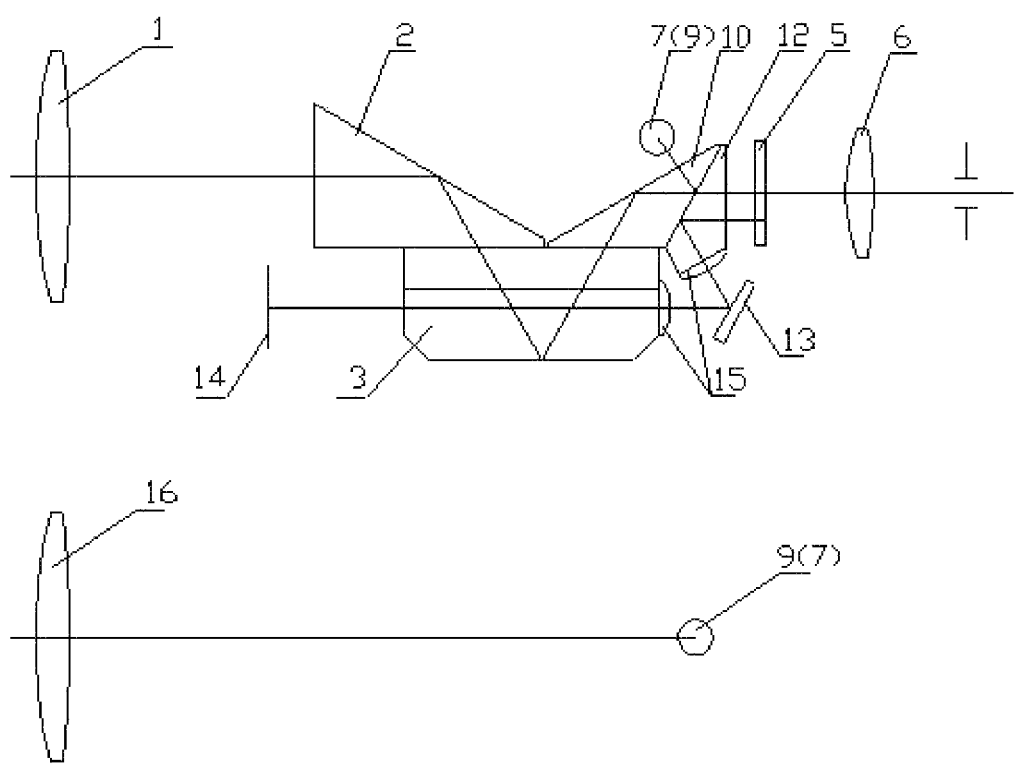
FIG. 7 is a schematic diagram of an optical path system in accordance with a seventh embodiment.

In the embodiment, the telescopic optical system with the functions of sighting and binocular viewing is constituted by the objective lens 1, the HYLON prism, the reticle lens 5 and the eyepiece 6. The laser emission system (or the laser receiving system) is constituted by the laser 7 (or the laser receiver 9), the HYLON prism and the objective lens 1; not combined with the HYLON prism and the objective lens 1, the laser receiver 9 (or the laser 7) is combined with the objective lens 16 to form the laser receiving system (or the laser emission system). As shown in FIG. 7, the three systems described above constitute a laser ranging monocular. The laser signal(s) measured by the laser ranging binocular is (are) transformed into data information via the signal processing circuit(s) which is displayed in field of view of the monocular through the reticle lens 5 made from transmissive liquid crystal displays (LCDs) or Organic Light-Emitting Diodes (OLEDs), or is projected in the focal plane of the objective lens 1 via the projection system constituted by the display 14, the HYLON prism, the lens 15 and the reflection mirror 13, and then is displayed in field of view of the monocular.

The invention claimed is:

1. A composite prism for multi-functional telescopes, characterized in that:
    it comprises a first half-pentaprism (2), a roof prism (3) and a second half-pentaprism (4), with longer right-angled surfaces of the first half-pentaprism (2) and the second half-pentaprism (4) cemented onto a bottom surface of the roof prism (3); and
    a light incident plane and a light emission plane of the roof prism (3) share the same one and are parallel to a roof edge of the roof prism (3) such that a light incident axis of the composite prism is parallel to its light emission axis,
    the second half-pentaprism (4) is replaced by a triangle prism (10) and a wedge prism (11) such that one of obtuse-angled surfaces of the triangle prism (10) is cemented onto the bottom surface of the roof prism (3) and the other obtuse-angled surface is cemented onto the wedge prism (11); and
    the cemented surfaces of the triangle prism (10) and the wedge prism (11) are coated with the light splitting film which can reflect laser light and is transmissive to visible light.

2. A composite prism for multi-functional telescopes, characterized in that:
    it comprises a first half-pentaprism (2), a roof prism (3) and a second half-pentaprism (4), with longer right-angled surfaces of the first half-pentaprism (2) and the second half-pentaprism (4) cemented onto a bottom surface of the roof prism (3), and
    a light incident plane and a light emission plane of the roof prism (3) share the same one and are parallel to a roof edge of the roof prism (3) such that a light incident axis of the composite prism is parallel to its light emission axis,
    two end surfaces of the roof prism (3) are transmissive to light and are vertical to the light incident axis of the composite prism;
    the second half-pentaprism (4) is replaced by the triangle prism (10) and an isosceles prism (12) such that one of obtuse-angled surfaces of the triangle prism (10) is cemented onto the bottom surface of the roof prism (3) and the other obtuse-angled surface is cemented onto the isosceles prism (12); and the cemented surfaces of the triangle prism (10) and the isosceles prism (12) are coated with the light splitting film which can reflect red light and is transmissive to other visible light.

3. The composite prism for multi-functional telescopes according to claim 2, characterized in that:

the longer right-angled surface of the first half-pentaprism (2) is coated with the light splitting film which can reflect laser light and is transmissive to visible light; and the cemented surfaces of the triangle prism (10) and the isosceles prism (12) are coated with the light splitting film which can reflect red light and is transmissive to other visible light.

4. The composite prism for multi-functional telescopes according to claim 2, characterized in that:

the cemented surfaces of the triangle prism (10) and the isosceles prism (12) are coated with the light splitting film which can reflect laser light and red light and is transmissive to other visible light.

5. A binocular telescopic optical system using a composite prism for multi-functional telescopes which comprises a first half-pentaprism (2), a roof prism (3) and a second half-pentaprism (4), with longer right-angled surfaces of the first half-pentaprism (2) and the second half-pentaprism (4) onto a bottom surface the roof prism (3); and a light incident plane and a light emission plane of the roof prism (3) share the same one and are parallel to a roof edge of the roof prism (3) such that a light incident axis of the composite prism is parallel to its light emission axis, characterized in that:

it comprises the objective lens (1), the composite prism, a reticle prism (5) and an eyepiece (6), the reticle prism (5) being plate glass which is engraved with partitions for sighting or measurement, or being transmissive liquid crystal display (LCD) or Organic Light-Emitting Diode (OLED); and light passes into the first half-pentaprism (2) through the objective lens (1), enters into the roof prism (3) from the cemented surfaces of the first pentaprism (2) and the roof prism (3) through the reflection of an oblique surface of the first half-pentaprism (2), enters into the second pentaprism (4) from the bottom surface of the roof prism (3) through the reflection of a roof surface of the roof prism (3), and then is emitted from the other right-angled surface of the second pentaprism (4) after reflected by an oblique surface of the second half-pentaprism (4), such that images are formed onto the reticle prism (5), and viewing and sighting can be performed via the eyepiece (6).

6. The binocular telescopic optical system according to claim 5 characterized in that:

the longer right-angled surface of the first half-pentaprism (2) is coated with the light splitting film which can reflect laser light and is transmissive to visible light; and a laser (7) or a laser receiver (9) is arranged on an optical path vertical to the oblique surface of the first half-pentaprism (2).

7. The binocular telescopic optical system according to claim 5 characterized in that:

the cemented surfaces of the triangle prism (10) and the wedge prism (11) are coated with the light splitting film which can reflect laser light and is transmissive to visible light; and the laser (7) or the laser receiver (9) is arranged on the optical path vertical to a reflection surface of the triangle prism (10).

8. The binocular telescopic optical system according to claim 5 characterized in that:

the two end surfaces of the roof prism (3) are transmissive to light and are vertical to the light incident axis of the composite prism;

the cemented surfaces of the triangle prism (10) and the isosceles prism (12) are coated with the light splitting film which can reflect red light and is transmissive to other visible light;

a display (14) is arranged on an optical path vertical to the end surfaces of the roof prism (3); and light emitted from the display (14) passes through the end surfaces of the roof prism (3), enters into the isosceles prism (12) through imaging of the lens (15) and a reflection of a reflection mirror (13), and then is emitted from uncemented surfaces of the isosceles prism (12), such that information displayed by the display (14) is imaged on a focal plane of the objective lens (1).

9. The binocular telescopic optical system according to claim 8 characterized in that:

the longer right-angled surface of the first half-pentaprism (2) is coated with the light splitting film which can reflect laser light and is transmissive to visible light; and the laser (7) or the laser receiver (9) is arranged on the optical path vertical to the oblique surface of the first half-pentaprism (2).

10. The binocular telescopic optical system according to claim 8 characterized in that:

the cemented surfaces of the triangle prism (10) and the isosceles prism (12) are coated with the light splitting film which can reflect laser light and red light and is transmissive to other visible light; and the laser (7) or the laser receiver (9) is arranged on an optical path vertical to a larger reflection surface of the triangle prism (10).

* * * * *